Sept. 29, 1970     M. M. BRANFIELD     3,531,151
HOUSE TRAILER
Filed April 11, 1968     3 Sheets-Sheet 1
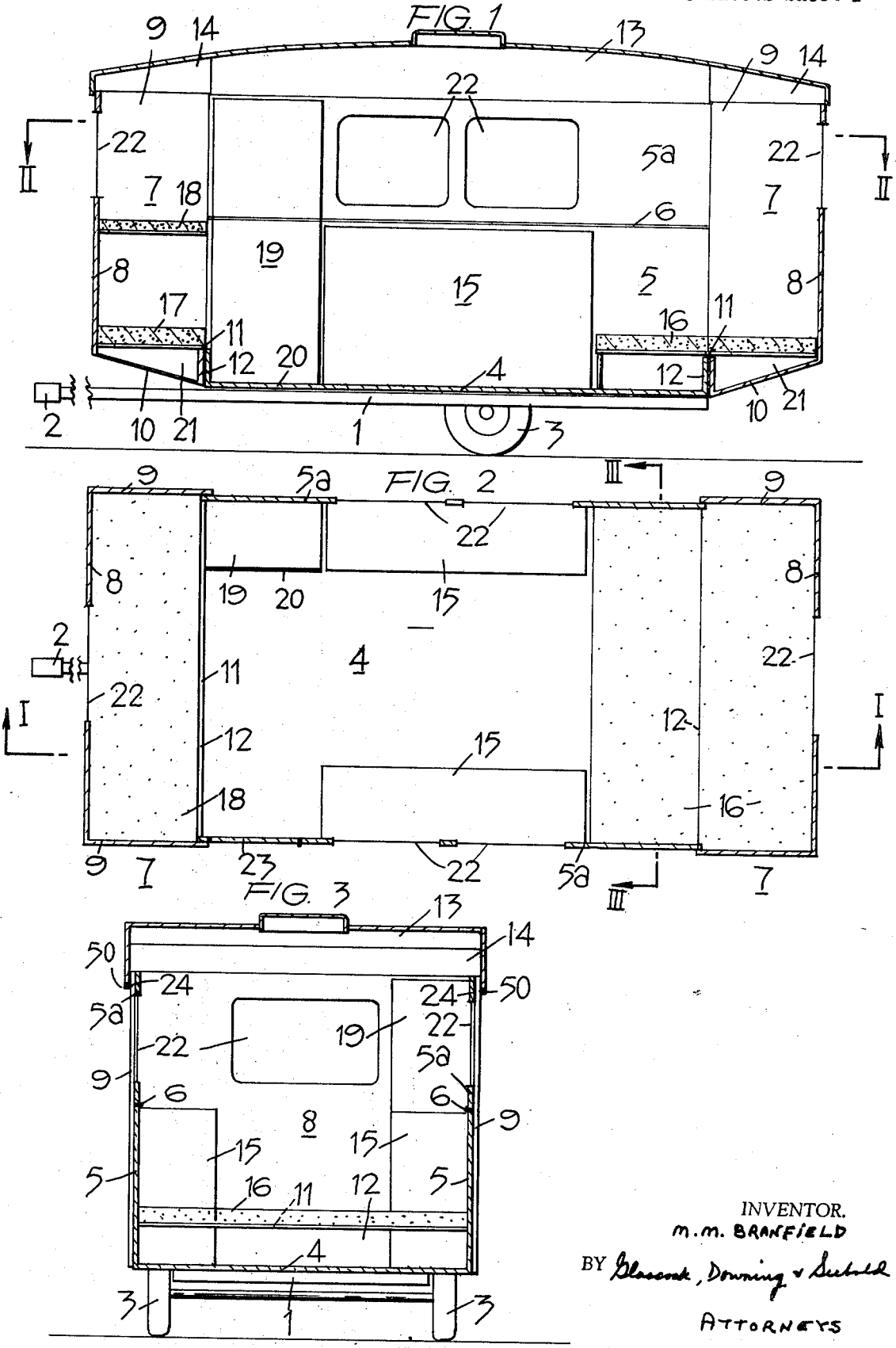
INVENTOR.
M. M. BRANFIELD
BY Glascock, Downing & Seebold
ATTORNEYS

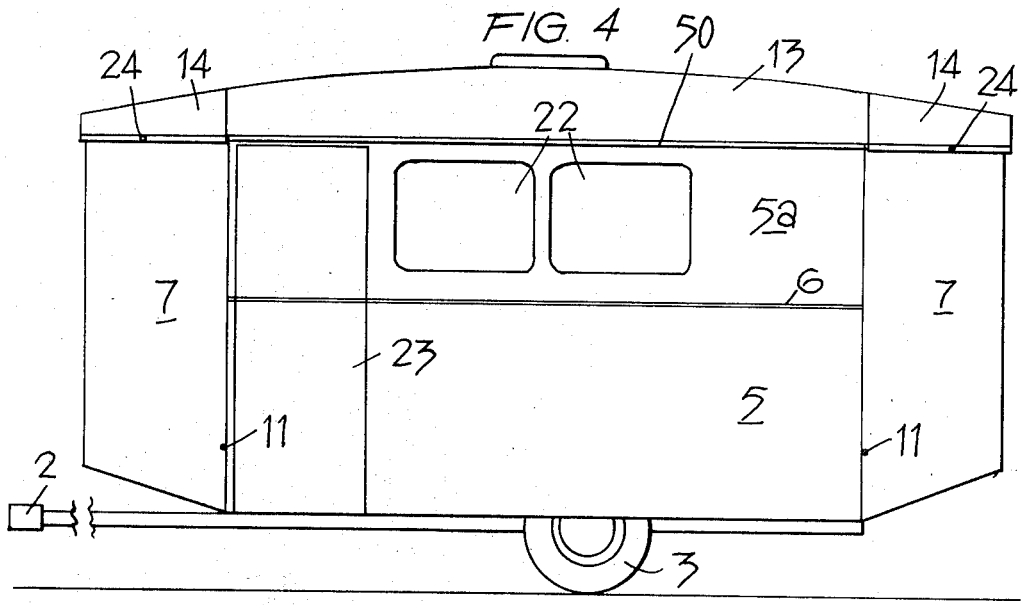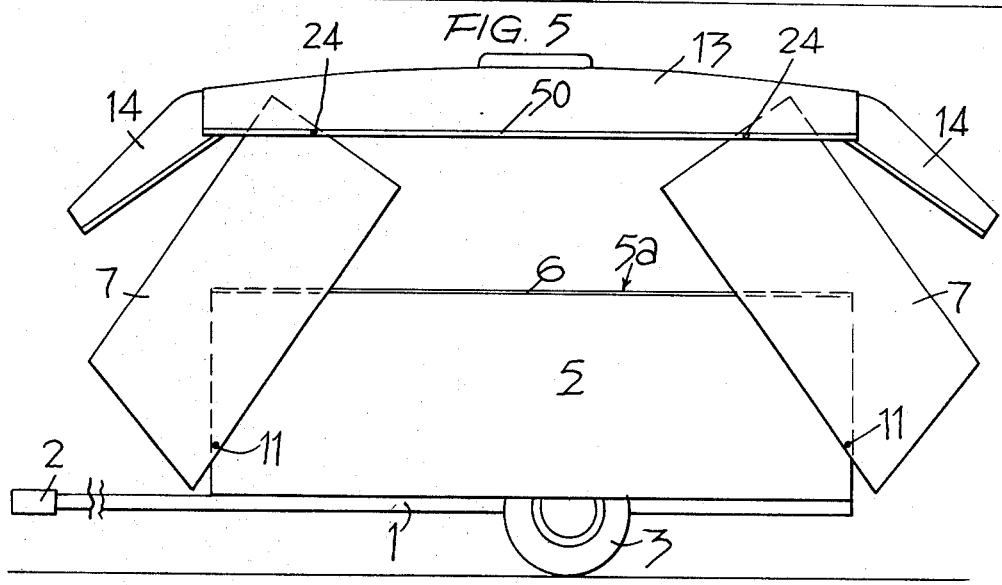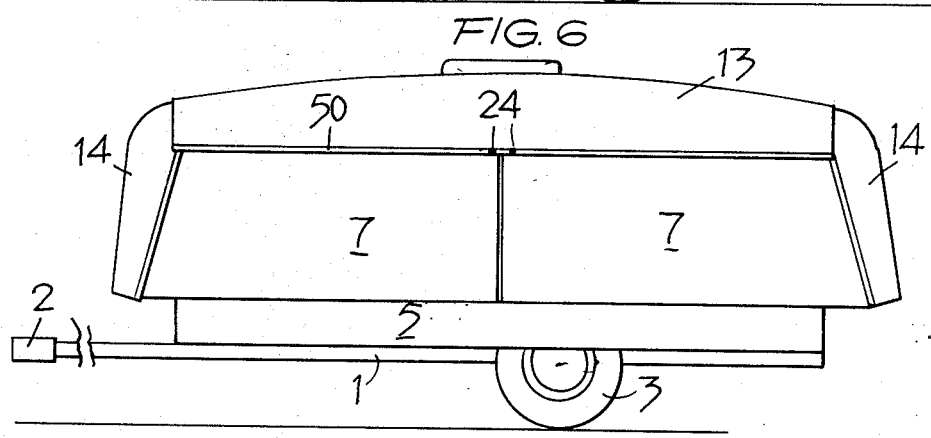

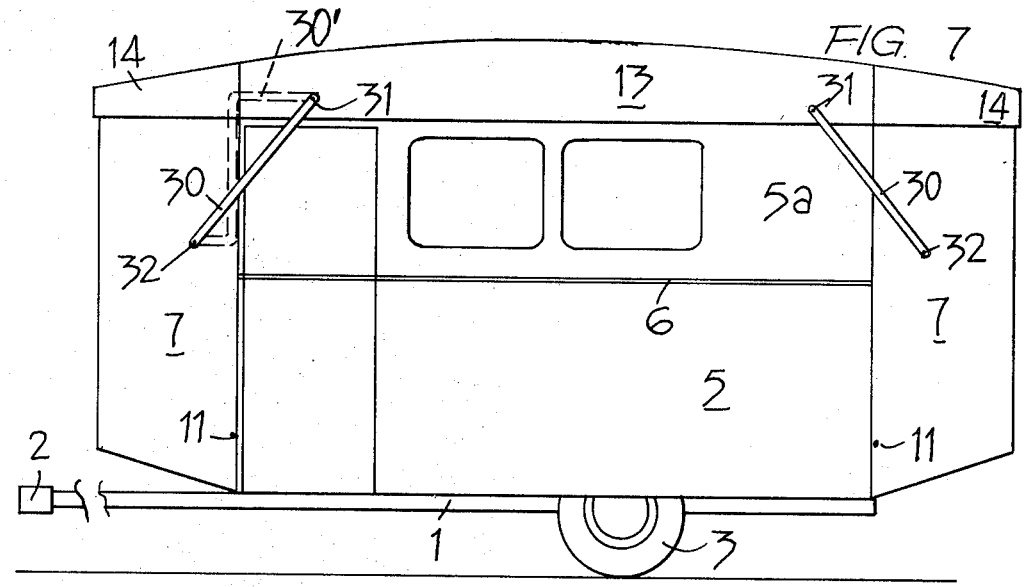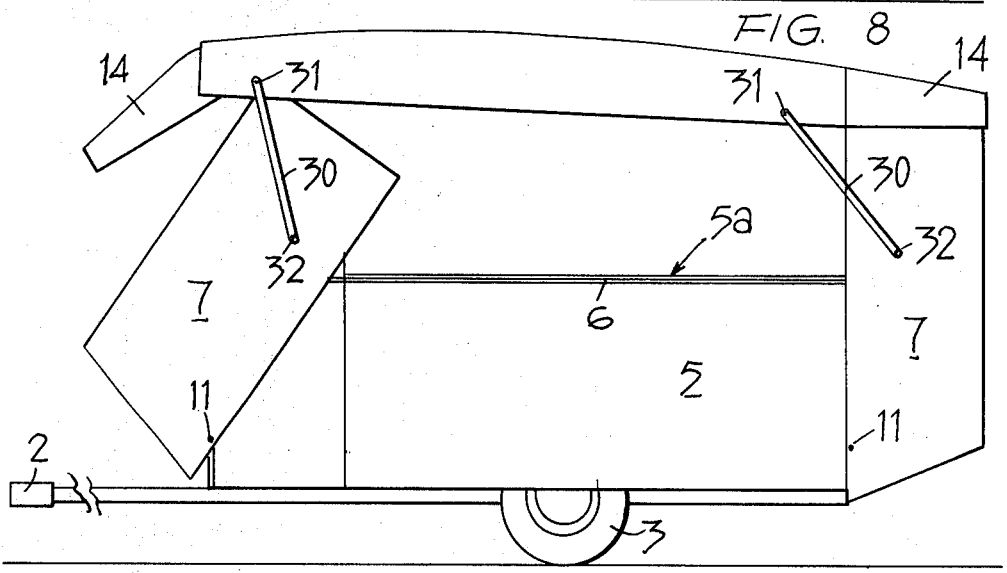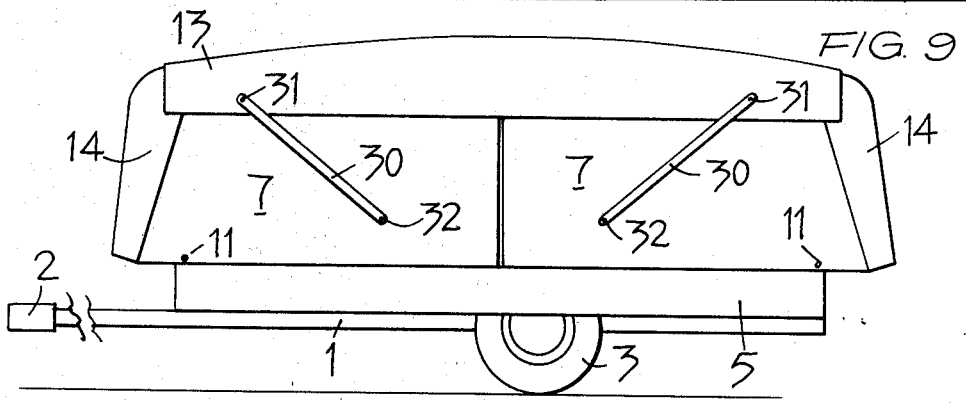

United States Patent Office 3,531,151
Patented Sept. 29, 1970

3,531,151
HOUSE TRAILER
Malcolm M. Branfield, Queenstown, Cape Province, Republic of South Africa, assignor of one-half to Cyril E. Nissen, Wembley, Pietermaritzburg, Natal, Republic of South Africa
Filed Apr. 11, 1968, Ser. No. 720,512
Claims priority, application Republic of South Africa, Feb. 29, 1968, 68/1,288, addition to Apr. 24, 1967, 67/2,425
Int. Cl. B60p 3/34
U.S. Cl. 296—23
4 Claims

ABSTRACT OF THE DISCLOSURE

Folding trailers including sections of rigid construction both when in the folded and erected positions. In one embodiment both the height and the length of the trailer are reduced when the trailer is in the folded position and in a second embodiment the trailer roof is continuously supported during the folding operation by strut means pivotally connecting the end walls and the roof.

BACKGROUND OF THE INVENTION

This invention relates to folding house trailer, that is trailer which may be folded from an erected position in which they may be occupied, to a trailer overall size which is more convenient when towing or storing the trailer.

The first collapsible trailers which were produced generally included panels or areas of flexible fabric or film, which were disadvantageous both from the point of view of durability and appearance and also for the security of the owners' belongings inside the trailer.

SUMMARY OF THE INVENTION

It is one object of this invention to provide a folding trailer which comprises an outer body shell composed of sections of rigid construction and adapted to be folded to a conveniently reduced overall height.

It is a further object of this invention in certain embodiments thereof to provide a folding trailer which is reduced not only in height when folded but also in length.

It is yet another object of certain embodiments of the invention to provide strut means adapted to support the roof continuously during the folding and erecting operations.

Further objects of this invention may become apparent in the course of the following description.

A folding trailer in accordance with this invention comprises a rectangular wheeled trailer base and floor structure, side walls rigidly fixed to the side edges thereof and articulated on horizontal hinges located at an intermediate height of the full wall height, the hinges being such that the upper wall parts can fold inwards, and the outer shell being composed of sections of rigid construction adapted to be folded down to a reduced overall height.

A folding trailer in accordance with one aspect of this invention further comprises two body end portions which each comprise an end wall, two side wall portions and a floor portion hingedly mounted near each end edge of the base and flood structure so that they can fold inwardly and thus reduce the overall length of the trailer body, with the roof capable of being reduced in length.

In accordance with a further aspect of this invention, the folding trailer further comprises two end walls hingedly mounted near each end edge of the base and floor structure so that they can fold inwardly, and at least one end wall adapted to support a roof continuously while being folded inwardly by strut means pivotally connecting the roof and end wall.

BRIEF DESCRIPTION OF THE DRAWINGS

FIG. 1 shows a trailer in longitudinal sectional elevation on section line 1—1 of FIG. 2,
FIG. 2 shows a trailer in sectional plan view on section line 2—2 of FIG. 1,
FIG. 3 shows the trailer on sectional end elevation on section line 3—3 of FIG. 2,
FIG. 4 shows the trailer in side elevation,
FIG. 5 shows the trailer in side elevation during the process of being folded,
FIG. 6 shows the trailer in side elevation when fully folded,
FIG. 7 shows a further trailer embodiment in side elevation,
FIG. 8 shows the trailer in side elevation during the process of being folded down, and
FIG. 9 shows the trailer in side elevation when fully folded.

DESCRIPTION OF THE PREFERRED EMBODIMENT

Referring to FIGS. 1, 2 and 3, the trailer comprises a trailer base and floor structure 1, incorporating a tow hitch 2 and wheels 3, and further features (not shown) as desired or required. The base 1 supports a floor 4 which has lower side wall portions 5 rigidly fixed to the floor 4. Upper side wall portions 5a are hingedly connected by horizontal hinges 6 to the lower side portions 5, so that the upper side wall portions 5a may be folded inwardly. Body end portions 7 each comprise an end wall 8, side wall portions 9 overlapping on the outside of side wall portions 5 and a floor 10, and are hinged by horizontal hinges 11 to the floor 4. Hinges 11 are located at the inner edges of the body end portions 7 and adjacent to the floor 4 on floor abutments 12. A main roof portion 13 has end roof portions 14 hingedly connected thereto near each end and rests, by means of tracks 50 set under the side edges of the main roof portion 13 and end roof portions 14 shown in FIGS. 3 to 6, slidably on support projections or rollers 24 near the tops of the side wall portions 9.

Referring to FIGS. 4, 5 and 6 the method of folding the trailer is as follows:

(1) Wardrobe 19 is folded down and the upper side wall portions 5a of the articulated side walls are folded on hinges 6 inwardly to a substantially horizontal position;

(2) The body end portions are folded inwardly on hinges 11 allowing the roof portions 13 and 14 to move downwardly and the support projections or rollers 24 in the tracks 50; and (3) The roof end portions 14 fold downwardly to complete the folding operation.

As FIG. 6 shows in relation to FIG. 4, the folded trailer is shorter and lower than the erected trailer; it will be observed that all the body panels are rigid, and none are detachable as a part of the folding method.

Referring again to such fittings as a refrigerator, stove, sink and storage cupboards, generally indicated at 15, are no higher than the level of the hinge 6, and the upper side wall portions 5a fold inwardly to rest on or just above such fittings in a substantially horizontal position.

The fittings 15 are permanently fixed in position and are not normally collapsible in any way.

A double bunk 16 and lower and upper bunks 17 and 18 respectively are fixed at opposite ends of the trailer.

The wardrobe 19 is hinged to the floor 4 by hinge 20 and is folded onto the floor 4 before the body of the trailer is folded as previously described.

Various storage compartments 21 are available in the body; windows 22 and door 23 are provided in suitable locations.

It will be appreciated that considerable variation of the dimensions and proportions are possible within the scope of the invention.

Such means as winches, ropes and/or pulleys may be provided to facilitate folding and erecting of the trailer, or at least parts thereof, and even power assistance, such as pneumatic pistons and cylinders could be provided if desired or required.

The method of folding the trailer may thus be improved by making use of a winch or winches, ropes or cables and pulleys.

Provision should be made for weatherproofing of all joints, such as by means of shielding, strips and sealing rubbers, located suitably so as to be effective both with the trailer erected and when folded, to minimize ingress of moisture and dust.

A roof construction in accordance with an alternative embodiment of the invention comprises a central and two end roof portions, with the two end roof portions each being connected to the central portion by two parallel, pivotally attached links on the left and right sides, such that the end roof portions may be moved apart from a position near each other to a position spaced further apart, and with the middle portion bridging the gap therebetween.

In accordance with an alternative preferred embodiment of the invention, the roof comprises two roof parts, one overlapping the other, adapted so that they may be slid from a position in which a substantial proportion of their lengths overlap to a position in which much less of their lengths overlap.

As shown in FIG. 7, the trailer comprises a trailer base and floor structure 1 having wheels 3 and a tow hitch 2. On the base and floor structure 1, side walls 5 are rigidly fixed, and are articulated on a horizontal hinge 6 so that the upper side wall portions 5a of the side walls may be folded downwardly into the body of the trailer. The hinge 6 also hinges the door 23, which may alternatively be made in the manner of a stable door. Attached onto the lower side wall portions 5 (or onto end edges of the base 1) the body end portions comprise end walls 8 and side wall portions 7 on either side in one unit and are hinged at hinge positions 11 for folding inwardly. The roof 13 has roof end portions 14 which may be folded inwardly in order to reduce the roof length, and the roof 13 is connected to the end wall portions 7 on either end by means of four struts 30 which are pivotally connected to the side wall portion 7 and to the roof, respectively. The struts 30 may be in the shape indicated by the dotted line 30' (on both ends as desired), to avoid obstructing the door 23 and in order to make the struts less conspicuous and blend more harmoniously with the style of the erected trailer, retaining the positions of pivotal attachments at 31 to the roof 13 and at 32 to the end wall portions 7. Alternatively, the struts 30 could be provided on the inner sides of the walls so that they would not be visible from the outside or even located in hollow passages between the walls if it were considered practical to provide the necessary slots or gaps in the wall 7.

The location of pivots 31 and 32 on the roof and body end portions respectively is important, and must be uniquely chosen if the trailer is to fold down without the effective length of the struts 30 varying between the erected (FIG. 7) and fully folded down (FIG. 9) positions.

As shown in FIG. 8, in order to fold down the trailer, the side wall top portions 5a are first folded inwardly to the inside of the trailer. One body end portion is then folded inwardly, initially raising the roof as a result of action of the struts 30, as shown in FIG. 8, and then bringing the roof downwardly onto the lower side wall portions 5. The other body end portion of the trailer may then be folded down so that the whole roof is brought down to rest on the lower side wall portions 5. The end roof portions 14 are then folded downwardly and the folded trailer appears as illustrated in FIG. 9.

The advantage of this form of connection of the roof 13 to the body end portions is that the struts 30 always hold the roof onto the trailer so that it can never be blown off by very violent winds, and the struts are less prone to jam or stick, as sometimes occurs in the case of slides and runners.

A further advantage is that the trailer be collapsed and erected by a single person in the manner indicated in the foregoing description. The struts 30 would also be considerably cheaper, probably costing less than many equivalent mechanical arrangements.

What I claim is:

1. A folding house trailer comprising a rectangular wheeled base and floor structure having two side edges and two end edges, side walls including upper and lower portions said lower portions being rigidly fixed to the side edges of said base and floor structure, a horizontal hinge interconnecting the upper and lower portions of each side wall to allow inward movement of the upper portion relative to the lower portion, an end assembly for each of said base and floor structure, each end assembly including an end wall, two side wall portions and a floor portion, a horizontal hinge connecting each end assembly to said base and floor structure adjacent each end edge of said base and floor structure to allow each end assembly to move inwardly relative to the base and the floor structure for reducing the overall length of the trailer, and a roof for the trailer, said roof including a main portion having a length substantially corresponding to the length of the base and floor structure and a further portion at each end thereof corresponding to the length of each end assembly, a horizontal hinge interconnecting each further end portion to each end of the main portion to allow downward movement of said further end portions when said upper portions of said side walls and said end assemblies are moved inwardly thereby reducing the length of the roof, and means for preventing downward movement of said further roof portions when said upper portions of said side walls and said end assemblies are upright.

2. The folding house trailer as claimed in claim 1 in which said last named means includes strut means pivotally connected to the main portion of said roof and to each end assembly.

3. The folding house trailer as claimed in claim 1 in which said last named means includes tracks along each longitudinal inner side of the main portion and further end portion of the roof and rollers movable along said tracks.

4. The folding house trailer as claimed in claim 2 in which the pivotal connections between each strut means and the main portion of the roof and each end assembly are such that the roof is initially lifted when the end assemblies are moved inwardly and lowered with the lowering of the end walls.

References Cited

UNITED STATES PATENTS

| 734,422 | 7/1903 | Leppert | 296—23 X |
| 2,837,778 | 6/1958 | Kern | 296—23 X |

PHILIP GOODMAN, Primary Examiner

U.S. Cl. X.R.

52—66